United States Patent
Chen et al.

(10) Patent No.: US 11,531,884 B2
(45) Date of Patent: Dec. 20, 2022

(54) SEPARATE QUANTIZATION METHOD OF FORMING COMBINATION OF 4-BIT AND 8-BIT DATA OF NEURAL NETWORK

(71) Applicant: NATIONAL CHIAO TUNG UNIVERSITY, Hsinchu (TW)

(72) Inventors: Tien-Fu Chen, Hsinchu (TW);
Chien-Chih Chen, Hsinchu (TW);
Jing-Ren Chen, Changhua County (TW)

(73) Assignee: National Chiao Tung University, Hsinchu (TW)

( * ) Notice: Subject to any disclaimer, the term of this patent is extended or adjusted under 35 U.S.C. 154(b) by 754 days.

(21) Appl. No.: 16/585,492

(22) Filed: Sep. 27, 2019

(65) Prior Publication Data
US 2021/0019616 A1 Jan. 21, 2021

(30) Foreign Application Priority Data
Jul. 16, 2019 (TW) ................. 108125092

(51) Int. Cl.
*G06N 3/063* (2006.01)
*G06N 3/08* (2006.01)
*G06N 3/04* (2006.01)
*G06N 7/04* (2006.01)

(52) U.S. Cl.
CPC ............... *G06N 3/08* (2013.01); *G06N 3/04* (2013.01); *G06N 7/046* (2013.01)

(58) Field of Classification Search
CPC ............ G06N 3/08; G06N 3/04; G06N 7/046; G06N 3/063; G06N 3/0481; G06N 3/0454
See application file for complete search history.

(56) References Cited

U.S. PATENT DOCUMENTS

| | | | |
|---|---|---|---|
| 10,229,356 B1* | 3/2019 | Liu | G10L 15/16 |
| 11,170,289 B1* | 11/2021 | Duong | G06N 5/04 |
| 2018/0046894 A1* | 2/2018 | Yao | G06N 3/0454 |
| 2018/0246855 A1* | 8/2018 | Redfern | G06F 3/0613 |
| 2020/0234130 A1* | 7/2020 | Yan | G06T 1/20 |

FOREIGN PATENT DOCUMENTS

| | | |
|---|---|---|
| CN | 107239829 A | 10/2017 |
| CN | 107451659 A | 12/2017 |
| WO | 2019056946 A1 | 3/2019 |

OTHER PUBLICATIONS

Foreign Patent Search Document Issued by a Foreign Patent Office (108125092).
(Continued)

*Primary Examiner* — Brandon S Cole
(74) *Attorney, Agent, or Firm* — Rosenberg, Klein & Lee (57) ABSTRACT

A separate quantization method of forming a combination of 4-bit and 8-bit data of a neural network is disclosed. When a training data set and a validation data set exist, a calibration manner is used to determine a threshold for activations of each of a plurality of layers of a neural network model, so as to determine how many of the activations to perform 8-bit quantization. In a process of weight quantization, the weights of each layer are allocated to 4-bit weights and 8-bit weights according to a predetermined ratio, so as to make the neural network model have a reduced size and a combination of 4-bit and 8-bit weights.

11 Claims, 6 Drawing Sheets

(56) References Cited

OTHER PUBLICATIONS

Darryl D. Lin, Sachin S. Talathi, V. Sreekanth Annapureddy, "Fixed Point Quantization of Deep Convolutional Networks," Proceedings of the 33rd International Conference on Machine Learning, New York, NY, USA, 2016, JMLR: W&CP vol. 48, Jun. 2, 2016, Abstract, 1. Introduction, 3. Floating point to fixed point conversion, 4. Bit-width optimization across a deep network, 5. Experiments.
Introduction to Neural Network Quantification, May 1, 2019, https://jackwish.net/2019/neural-network-quantizationintroduction-chn.html, 1 ~6.
Jacob, et al. "Quantization and Training of Neural Networks for Efficient Integer-Arithmetic-Only Inference." Proc. 2018 IEEE/CVF Conf. Computer Vision and Pattern Recognition (CVPR) (Jun. 2018), pp. 2704-2713. doi: 10.1109/CVPR.2018.00286.
Park, et al. "Value-Aware Quantization for Training and Inference of Neural Networks." arXiv: 1804.07802v1 [cs. NE] (Apr. 2018), pp. 1-16.
Park, et al. "Energy-Efficient Neural Network Accelerator Based on Outlier-Aware Low Precision Computation." Proc. 2018 ACM/IEEE 45th Annual International Symposium on Computer Architecture (ISCA) (Jun. 2018), pp. 688-698. doi: 10.1109/ISCA.2018.00063.

* cited by examiner

SEPARATE QUANTIZATION METHOD OF FORMING COMBINATION OF 4-BIT AND 8-BIT DATA OF NEURAL NETWORK

BACKGROUND OF THE INVENTION

1. Field of the Invention

The present invention relates to a neural network technique, more particularly to a separate quantization method of forming a combination of 4-bit and 8-bit data of a neural network.

2. Description of the Related Art

The core of the artificial neural network includes a large number of multiply-accumulate operations, and it requires a large amount of memories and computing resources for operation. In general, the quantization technology can convert weights from original 32-bit floating-point numbers to fixed-point numbers with lower bits, to reduce a model size and improve computational efficiency. Since the quantization process reduces the accuracy of the neural network model, the quantized model is usually fine-tuned or re-trained to compensate for the loss of accuracy.

Figure 1A:
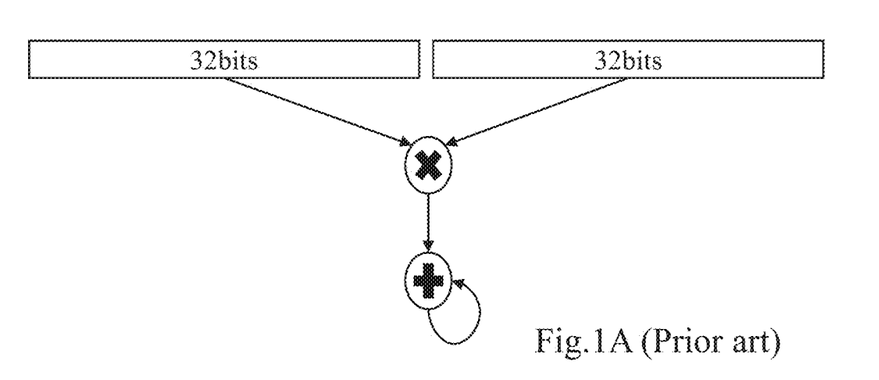
FIG. 1A shows multiply accumulate operations of 32-bit floating-point data in the prior art.
Figure 1B:
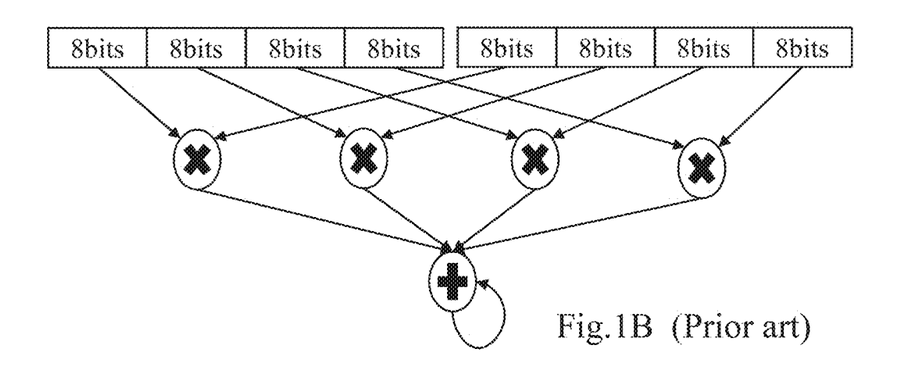
FIG. 1B shows multiply accumulate operations of 8-bit quantized data.
Figure 1C:
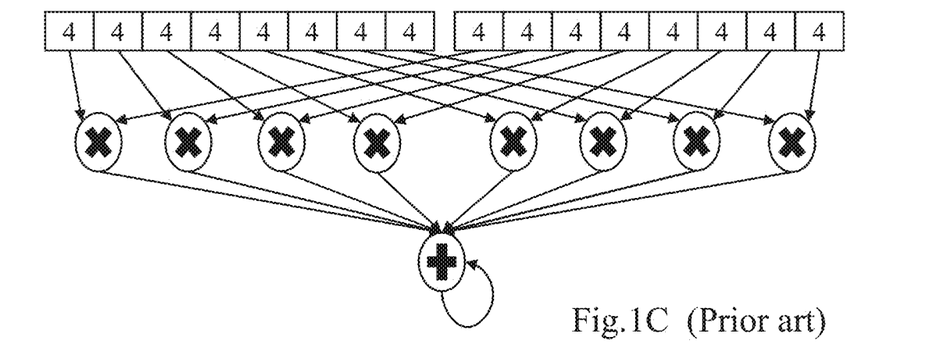
FIG. 1C shows multiply accumulate operations of 4-bit quantized data.

Specifically, the quantization process is commonly performed on a convolution layer and a fully-connected layer which are based on multiply-accumulate operations. In recent years, the standard operation of the neural network model is to calculate and store weights in a 32-bit floating-point numbers, as shown in FIG. 1A; and in order to speed up the operation and reduce the size of the model, the quantization method, which is also called as a compression method, can convert the weights into 8-bit fixed-point numbers, as shown in FIG. 1B, so that the ideal operation can achieve four times acceleration and the model can still keep good accuracy. However, when the weights are further quantized to 4-bit weights, as shown in FIG. 1C, the computational efficiency can be further improved, but the accuracy is greatly reduced, and it deteriorates the quality of the trained model. Therefore, most of the quantization techniques keep the number of bits of the weight above 8 to maintain the accuracy of the original model. When the weight is quantized to 4 bits, the accuracy is greatly reduced and it is usually necessary to fine-tune or re-train the model to compensate for the loss of the accuracy. However, this compensation process is time-consuming and requires huge computing resources; in addition, it is very likely that the training data set and the validation data set of the pre-trained model are not available, and the fine tuning and retraining processes for the model cannot be performed.

Therefore, the present invention proposes a separate quantization method of forming a combination of 4-bit and 8-bit data of a neural network to effectively solve the above problems, and the specific architecture and embodiments of the separate quantization method will be described in detail below.

SUMMARY OF THE INVENTION

An objective of the present invention is to provide a separate quantization method of forming a combination of 4-bit and 8-bit data of a neural network, and the separate quantization method is able to quantize a large part of activations and weights to 4-bit data and quantize the remaining activations and weights to 8-bit data, so as to reduce a size of a neural network model and also maintain or improve accuracy of the neural network model.

Another objective of the present invention is to provide a separate quantization method of forming a combination of 4-bit and 8-bit data of a neural network, and in the case where a training data set and a validation data set exist, prior calibration and Euclidean distance calculation are used to obtain the most appropriate threshold for the activations of each layer without sorting the weights by value before the weights are separated to perform 4-bit and 8-bit quantization, so as to effectively improve computational efficiency.

In order to achieve the objective, the present invention provides a separate quantization method of forming a combination of 4-bit and 8-bit data of a neural network, and the separate quantization method includes the following steps of: inputting a trained neural network model, and determining whether at least one training data set and at least one validation data set exist; when the training data set or the validation data set exists, using a calibration manner to determine a threshold for activations of each of a plurality of layers of the neural network model, to determine how many of the activations to perform 8-bit quantization and to determine the remaining activations to perform 4-bit quantization, when any one of the training data set and the validation data set does not exist, uniformly allocating the activations of the plurality of layers of the neural network model to perform 4-bit quantization and the 8-bit quantization; quantizing the weights of the neural network model, and when the training data set and the validation data set exist, determining a part of the weights of each layer to perform 4-bit quantization and the other part to perform 8-bit quantization according to a predetermined ratio, and when any one of the training data set and the validation data set does not exist, uniformly quantizing the weights of each layer to 4-bit weights and 8-bit weights; and obtaining an optimized neural network model with a combination of the 4-bit and 8-bit quantized weights.

According to an embodiment of the present invention, the calibration manner comprises steps of: obtaining a subset, from the validation data set or the training data set, as a calibration data set; performing the neural network model on the calibration data set, to obtain an activation function for the activations of each of the plurality of layers after a batch is performed; and using an Euclidean distance algorithm to calculate a threshold of each layer according to the activation function, layer by layer.

Furthermore, the operation of using the Euclidean distance algorithm comprises steps of: testing 1024 different first thresholds for each layer; calculating the Euclidean distances corresponding to each first threshold before and after quantization, and selecting the first threshold corresponding to the smallest one of the calculated Euclidean distances, as a second threshold of the batch; and repeating the step of performing the neural network model on the calibration data set, and after all batches are performed completely and the second thresholds of all the batches are obtained, selecting a middle value of all the second thresholds as a final threshold.

According to an embodiment of the present invention, the step of determining a part of the weights of each layer to perform 4-bit quantization and the other part to perform 8-bit quantization according to the predetermined ratio, comprises steps of: (a) using the validation data set to measure the accuracy of the quantized neural network model; and (b) when the accuracy is within a preset range, using the quantized neural network model as the optimized neural network model and outputting the optimized neural network model, and when the accuracy is not within the preset range, determining whether the training data set exists; (c1) when the training data set exists, performing re-training, and returning to the step (a) to measure the accuracy again; (c2) when the training data set does not exist, adjusting the predetermined ratio and re-quantizing the weights, and then returning to the step (a) to measure the accuracy again.

BRIEF DESCRIPTION OF THE DRAWINGS

The structure, operating principle and effects of the present invention will be described in detail by way of various embodiments which are illustrated in the accompanying drawings.

FIG. 1A to FIG. 1C are schematic views of multiply accumulate operations of a neural network model in the prior art, wherein

DETAILED DESCRIPTION OF THE PREFERRED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

Figure 2:
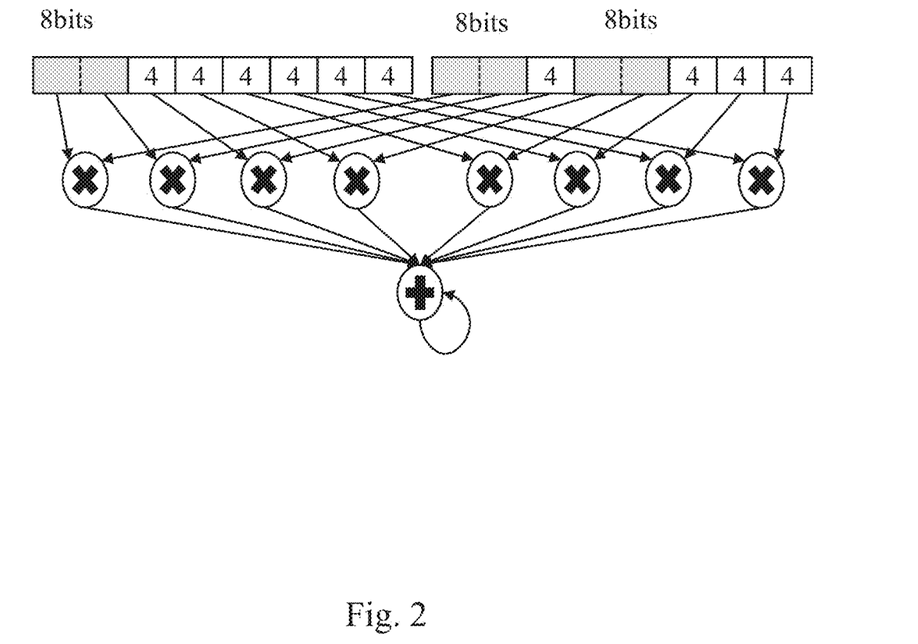
FIG. 2 is a schematic view of an operation of separate quantization method of forming a combination of 4-bit and 8-bit data of neural network, according to the present invention, wherein some weights are quantized to 8-bit weights and the remaining weights are quantized to 4-bit weights.

The present invention provides a separate quantization method of forming a combination of 4-bit and 8-bit data of a neural network. A large amount of weights and activations of the layers of the original neural network model are 32-bit floating-point numbers, and after the 32-bit floating-point numbers are converted into fixed-point numbers with less bits, the present invention further allocates the fixed-point numbers to perform 4-bit quantization and 8-bit quantization, and most of the fixed-point numbers with lower values are quantized to 4-bit data, and the remaining fixed-point numbers with higher values are quantized to 8-bit data, as shown in FIG. 2, so that the size of the neural network model can be reduced, and the accuracy of the neural network model can be the same as or better than that of the conventional neural network model with 8-bit data.

The separate quantization method of the present invention converts the original floating-point data into fixed-point data, and the original floating-point data and the converted fixed-point data are in a linear correspondence relationship expressed as following equation (1):

$$Q=s(R-b) \quad (1)$$

wherein Q is a quantized fixed-point integer, R is an original floating-point data, b is a bias value which can usually be ignored, s is a scaling factor and can be determined by dividing a corresponding quantization range by an amount of quantization levels minus one, and the determination manner can be expressed as following equation (2):

$$s=\text{real\_range}/(2\textasciicircum\text{bitwidth}-1) \quad (2)$$

For example, 4-bit quantization has 16 (2^4=16) levels, 8-bit quantization has 256 (2^8=256) levels, so the combination of 4-bit and 8-bit quantization of the present invention has 272 (16+256=272) levels in total.

Figure 3:
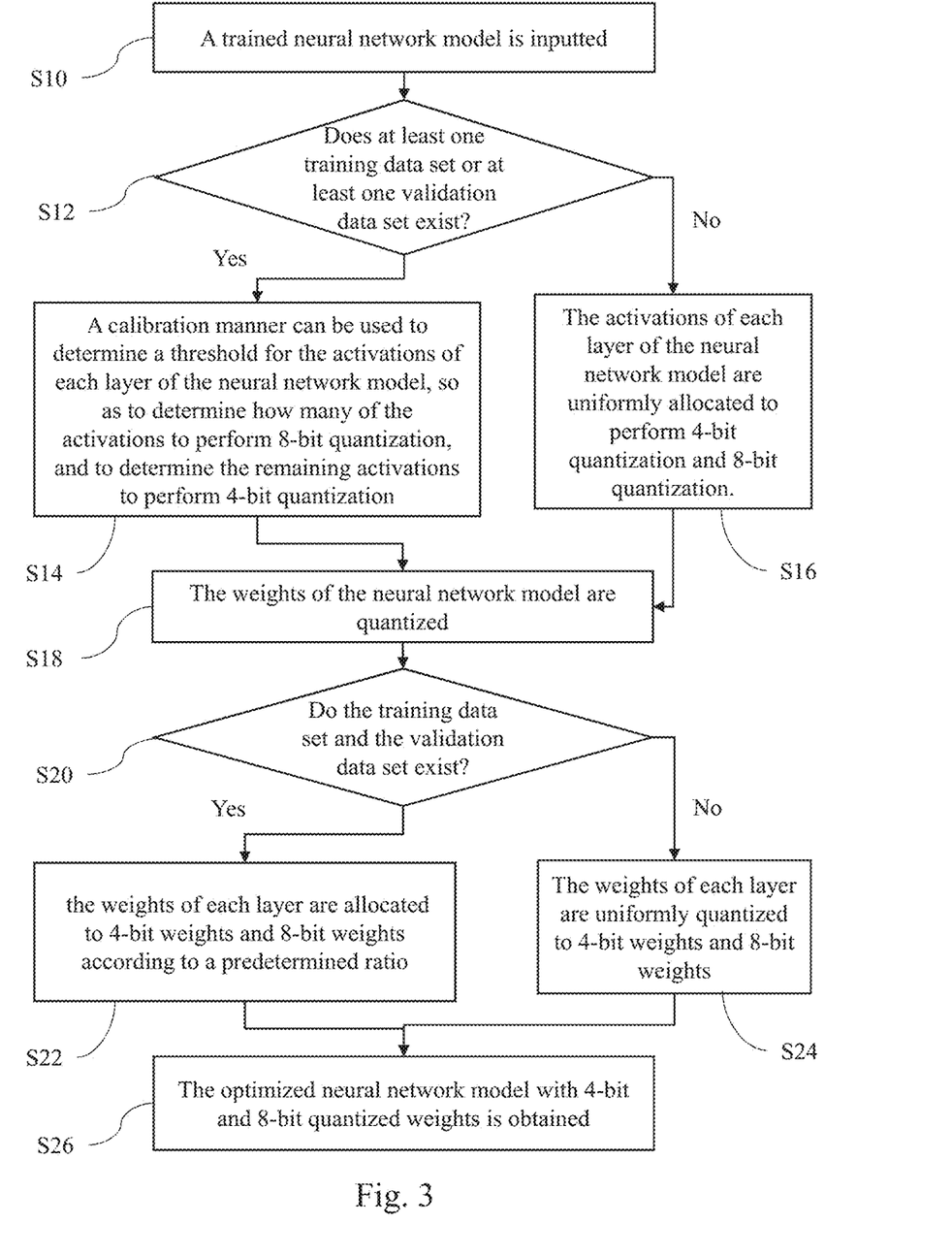
FIG. 3 is a flowchart of a separate quantization method of forming a combination of 4-bit and 8-bit data of a neural network, according to the present invention.

Please refer to FIG. 3, which is a flowchart of the separate quantization method of forming a combination of 4-bit and 8-bit data of neural network of the present invention. First, the activations of each layer are processed. Since the activations are generated only after data is inputted, in a step S10 a trained neural network model is inputted, and more particularly, the activations of a rectified linear unit layer are quantized as unsigned numbers according to the characteristic that the activations of the rectified linear unit layer are greater than or equal to zero. In the process of processing the activation, first, in a step S12 it must be determined whether at least one training data set or at least one validation data set exists. Next, in a step S14, when the training data set or the validation data set exists, a calibration manner can be used to determine a threshold for the activations of each layer of the neural network model, so as to determine how many of the activations to perform 8-bit quantization, and to determine the remaining activations to perform 4-bit quantization. In contrast, in a step S16, when any one of the training data set and the validation data set does not exist, the activations of each layer of the neural network model are uniformly quantized, that is, the 272 levels of 4-bit and 8-bit quantization are uniformly distributed.

In a step S18, after the activations are quantized completely, the weights of the neural network model are quantized. In an embodiment, the weight quantization is performed on weights of a convolution layer and a fully-connected layer of the neural network model, and in a step S20 it is also necessary to first determine whether the training data set and the validation data set exist. In a step S22, when the training data set and the validation data set exist, a part of the weights of each layer is determined to perform 4-bit quantization and the remaining part is determined to perform 8-bit quantization according to a predetermined ratio. The predetermined ratio is a ratio of the 8-bit weights of each layer, and is usually set as a small value initially, for example, the quantization is started in a condition that 1% of the weights are allocated to be 8-bit weights and 99% of the weights are allocated to be 4-bit weights, and the ratio of 4-bit weights is gradually decreased in sequential quantization, so as to increase the accuracy of the neural network model. In a step S24, when it is determined that any one of the training data set and the validation data set does not exist (in the step S20), the weights of each layer are uniformly quantized to 4-bit weights and 8-bit weights. Finally, in a step S26, the optimized neural network model with 4-bit and 8-bit quantized weights can be obtained. In particular, linear proportional compression can be performed on the 4-bit weights and the 8-bit weights of the present invention according to original data of the neural network model.

Figure 4:
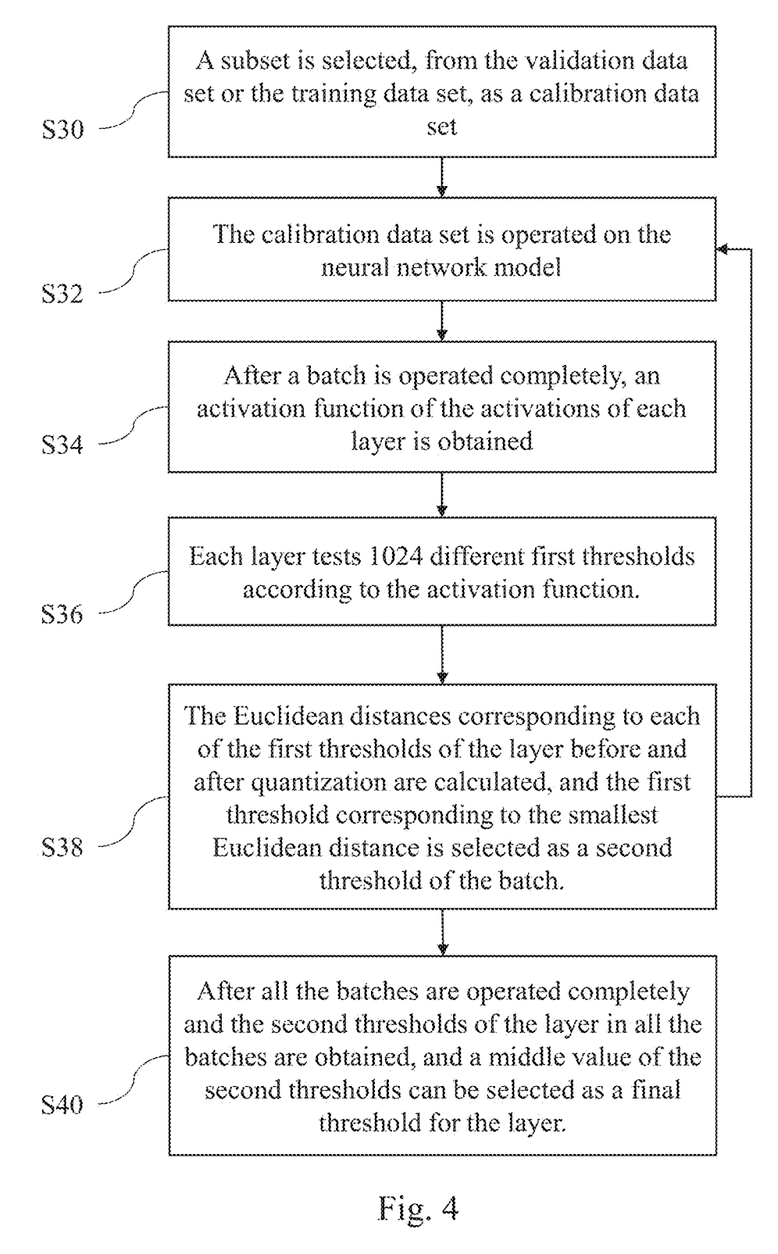
FIG. 4 is a flowchart of an operation of using a calibration manner and Euclidean distances to calculate a threshold of each layer, according to a separate quantization method of the present invention.

The operation of using the calibration manner to determine the threshold (in the step S14) is shown in FIG. 4, which is a flowchart of an operation of calculating the threshold of each layer by using calibration manner and an Euclidean distance algorithm. In a step S30, first, a subset is selected from the validation data set or the training data set, and the subset is used as a calibration data set. In an embodiment, the subset is usually selected from the validation data set first, and if the validation data set does not exist, the subset can be selected from the training data set as the calibration data set. The calibration data set must be diversified and representative. Next, in a step S32, the calibration data set is operated on the neural network model, which is inputted in the beginning. In a step S34, after a batch is operated completely, an activation function of the activations of each layer can be obtained. Next, based on the activation function, an Euclidean distance (or called as an L2-distance) of each of the layers can be used to calculate the threshold, layer by layer. Next, in a step S36, each layer can test 1024 different first thresholds according to the activation function. The manner of calculating the 1024 different first thresholds is expressed as following equation (3):

$$\text{threshold\_value}_i = \text{input}_{max} * (i/1024) \quad (3)$$

Since the 1024 levels are equivalent to the range which can be expressed by 10 bits, testing 1024 different first thresholds is sufficient for most neural networks.

Next, in a step S38, the Euclidean distances corresponding to each of the first thresholds of the layer before and after quantization are calculated, and the first threshold corresponding to the smallest Euclidean distance is selected as a second threshold of the batch.

The method of calculating the Euclidean distance can be expressed as following equation (4):

$$d(p, q) = \sqrt{\sum_{i=1}^{n}(p_i - q_i)^2} \quad (4)$$

wherein p, q are two points in a n-dimensional Euclidean space, and n is a total amount of candidates for the second threshold. Since the 1024 different first thresholds are tested in the step S36, the total amount of the candidates for the second threshold is 1024.

The steps S32 to S38 are repeated. After all the batches are operated completely and the second thresholds of the layer in all the batches are obtained, and in the step S40 a middle value of the second thresholds can be selected as a final threshold for the layer; in other words, the final threshold also corresponds to a median of the Euclidean distances, so as to prevent extreme values from affecting the overall accuracy.

Figure 5:
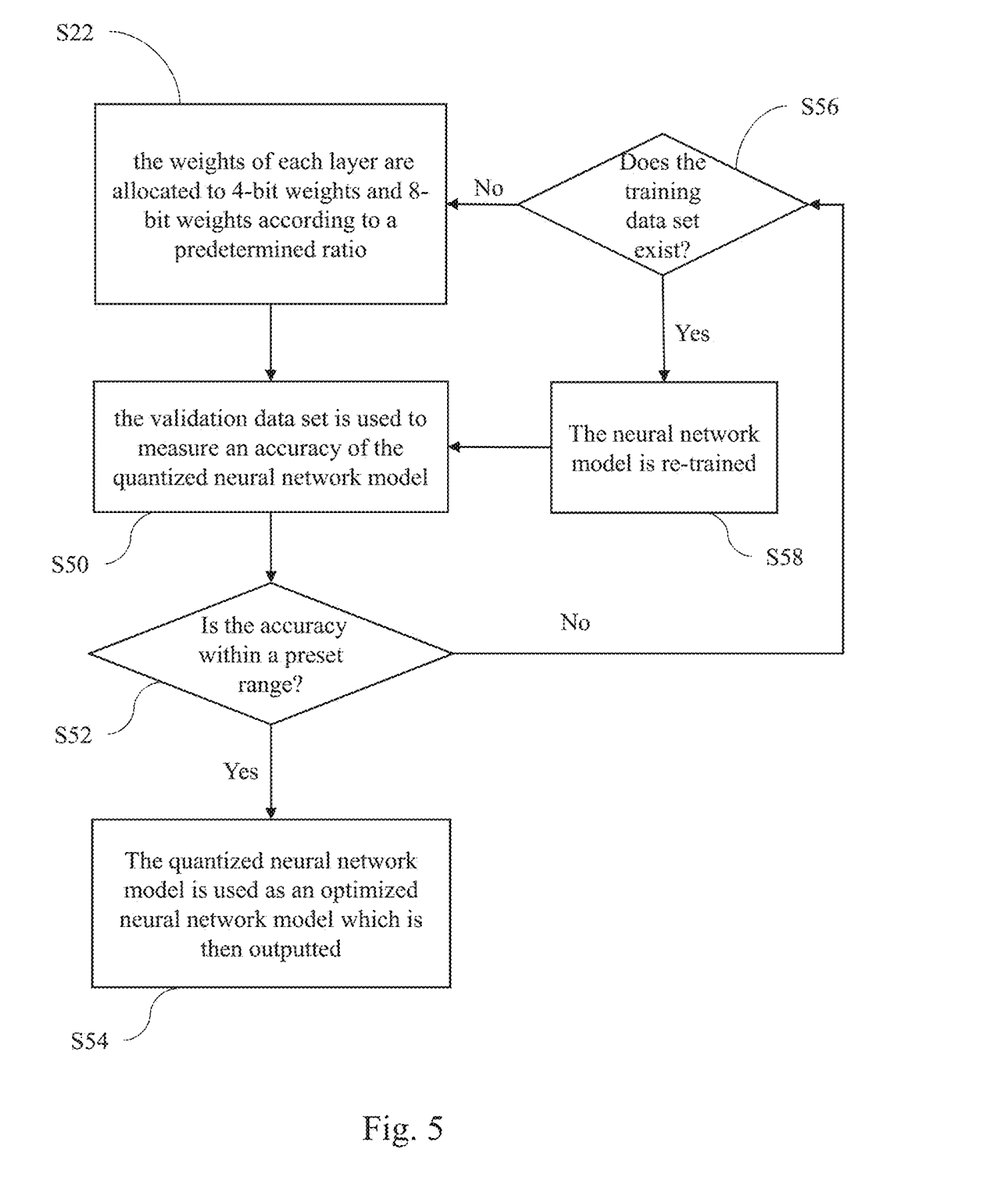
FIG. 5 is a flowchart of an operation of adjusting a ratio for weight quantization, according to a separate quantization method of the present invention.

After the step S22 shown in FIG. 3, it is also necessary to measure the accuracy of the quantized neural network model, and the manner of measuring accuracy includes using the validation data set to perform objective measurement, and inputting the training data set into the training model to improve the accuracy. Please refer to FIG. 5, which is a flowchart of an operation of adjusting the ratio to quantize the weights according to the present invention. As shown in FIG. 5, in a step S50 the validation data set is used to measure the neural network model, which has the weights quantized according to the predetermined ratio in the step S22; and in step S52, it is determined whether the accuracy is within a preset range. The model accuracy loss can be parameterized, and if the preset range for the parameterized accuracy loss is not set yet, 1% of accuracy loss can be used as the preset range. When the accuracy is within the preset range, the neural network model can be used as the optimized neural network model which is then outputted, as shown in a step S54, and the entire quantization process is completed. Otherwise, when the accuracy is not within the preset range, in a step S56 it is determined whether the training data set exists. In a step S58, when the training data set exists, the neural network model is re-trained, and in a forward stage the weights of each layer are quantized according to the predetermined ratio, and the weights are then stored as floating-point weights in a backward stage, and the operation returns to the step S50 to measure the accuracy after the re-training. When the accuracy is still not within the preset range, the predetermined ratio is adjusted and the neural network model is then re-trained; however, when it is determined that the accuracy is not within the preset range (in the step S52) and the training data set does not exist (in the step S56), the operation returns to the step S22 to adjust the predetermined ratio, that is, a higher ratio is selected for re-quantization of the weights, and the step (a) is then repeated to measure the accuracy again.

Figure 6A:
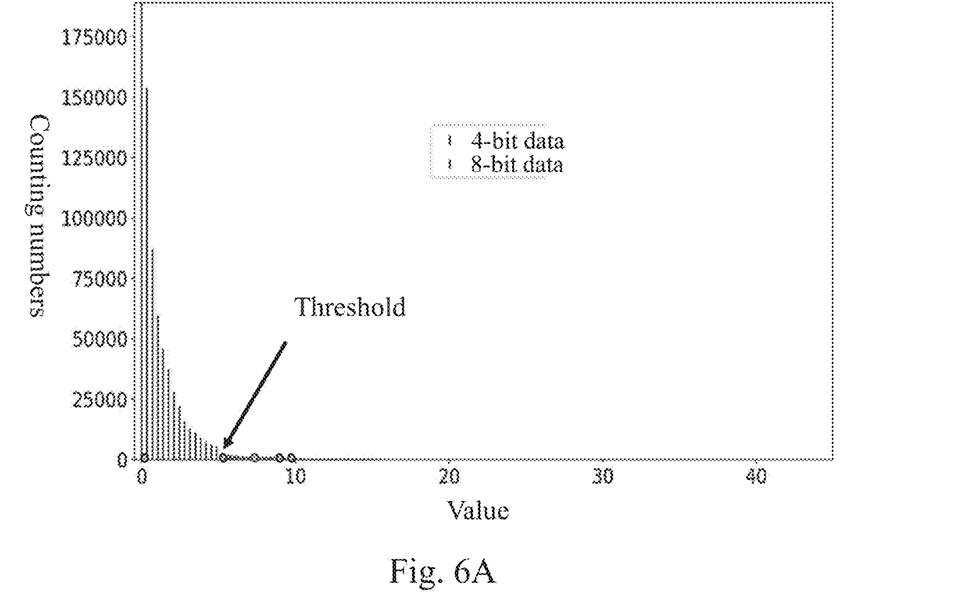
FIG. 6A is a schematic view of a threshold for quantizing activations, according to a separate quantization method of the present invention.
Figure 6B:
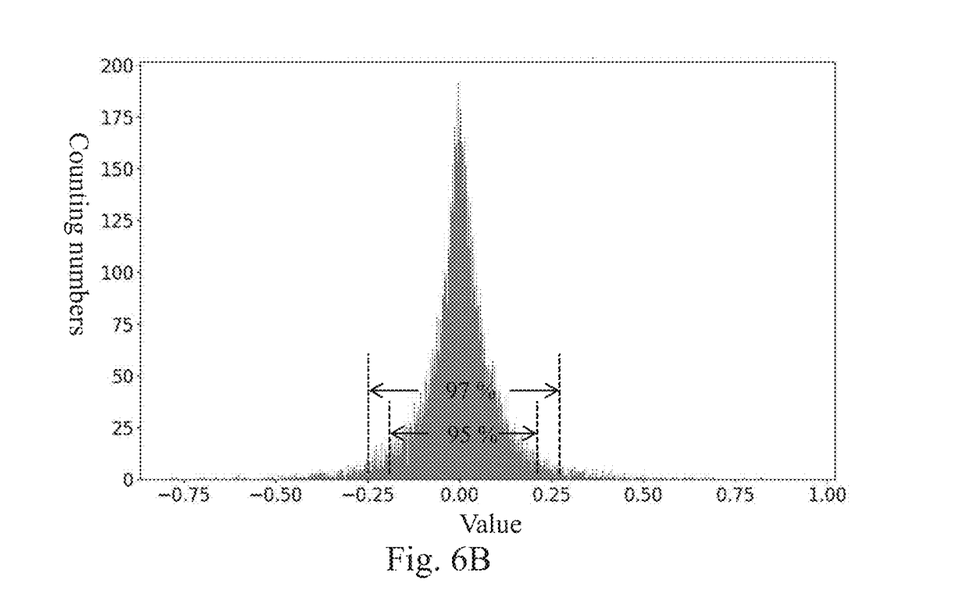
FIG. 6B is a schematic view of a quantized weight distribution, according to a separate quantization method of the present invention.

FIG. 6A is a schematic view of a threshold for quantizing activations according to a separate quantization method of the present invention, and FIG. 6B is a schematic view of a quantized weight distribution, according to the separate quantization method of the present invention. In order to quantize and compress an image, the second threshold is obtained by operating the calibration data set for five batches, as shown in FIG. 6A, wherein the second threshold corresponds to the Euclidean distance before and after the quantization, and the median is the threshold candidate with a value of 5, and the threshold corresponding to the median is set as the final threshold which is used to quantize the activations of the layer. Next, the weight quantization is performed. As shown in FIG. 6B, the weights within a peak portion between −0.25 and 0.25 are quantized to 4-bit weights, and the weights within portions lower than −0.25 and higher than 0.25 are quantized to 8-bit weights. As a result, 95~97% of weights are quantized to 4-bit weights and only 3-5% of weights are quantized to 8-bit weights. Therefore, the separate quantization method of the present invention can quantize most of the data to 4-bit data and quantize a small part of the data to 8-bit data.

According to above-mentioned contents, the separate quantization method of forming a combination of 4-bit and 8-bit data of the neural network according to the present invention starts quantization according to a small ratio of 8-bit data, and the ratio of 8-bit data is gradually increased in sequential quantization, so that most of data, including activations and weights, with small values can be quantized to 4-bit data, and only the remaining less data with high values can be quantized to 8-bit data, but the accuracy is still within the preset range and even higher than the accuracy of the neural network model having 8-bit quantized data. As a result, the size of the neural network model can be reduced. Furthermore, the separate quantization method of the present invention can use prior calibration and Euclidean distance calculation to obtain the most appropriate threshold for the activations of each layer without sorting the weights by value in advance when the weights are separated to perform 4-bit and 8-bit quantization, so that the computational efficiency can be effectively improved.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A separate quantization method of forming a combination of 4-bit and 8-bit data of a neural network, comprising,
    inputting a trained neural network model, and determining whether at least one training data set and at least one validation data set exist;
    when the at least one training data set or the at least one validation data set exists, using a calibration manner to determine a threshold for activations of each of a plurality of layers of the neural network model, so as to determine how many of the activations to perform 8-bit quantization and determine the remaining activations to perform 4-bit quantization;
    when the at least one training data set and the at least one validation data set do not exist, uniformly allocating the activations of each of the plurality of layers of the neural network model to perform 4-bit quantization and 8-bit quantization;
    quantizing weights of the neural network model, and when the at least one training data set and the at least one validation data set exist, allocating the weights of each of the plurality of layers to 4-bit weights and 8-bit weights according to a predetermined ratio, and when any one of the training data set and the validation data set does not exist, uniformly allocating the weights of each of the plurality of layers to the 4-bit weights and the 8-bit weights; and
    obtaining an optimized neural network model with 4-bit and 8-bit quantized weights.

2. The separate quantization method according to claim 1, wherein an operation of the calibration manner comprises:
    obtaining a subset, from the validation data set or the training data set, as a calibration data set;
    performing the neural network model on the calibration data set, and after a batch is performed, obtaining an activation function of the activations of each of the plurality of layers; and
    according to the activation function, using an Euclidean distance algorithm to calculate the thresholds for the plurality of layers, layer by layer.

3. The separate quantization method according to claim 2, wherein the step of using the Euclidean distance algorithm, comprises:
    testing 1024 different first thresholds for each of the plurality of layers;
    calculating Euclidean distances corresponding to each of the 1024 different first thresholds before and after quantization, and selecting the first threshold corresponding to the smallest one of the calculated Euclidean distances as a second threshold of the batch; and
    repeating the step of performing the neural network model on the calibration data set, and after all the batches are performed completely and the second thresholds of all the batches are obtained, selecting one of all the second thresholds corresponding to a middle value of the Euclidean distances before and after quantization, as a final threshold.

4. The separate quantization method according to claim 1, wherein the activations of each of the plurality of layers are activations of a rectified linear unit layer, and the activations of the rectified linear unit layer are quantized to unsigned numbers.

5. The separate quantization method according to claim 2, wherein the activations of each of the plurality of layers are activations of a rectified linear unit layer, and the activations of the rectified linear unit layer are quantized to unsigned numbers.

6. The separate quantization method according to claim 3, wherein the activations of each of the plurality of layers are activations of a rectified linear unit layer, and the activations of the rectified linear unit layer are quantized to unsigned numbers.

7. The separate quantization method according to claim 1, after the step of allocating the weights of each of the plurality of layers to the 4-bit weights and the 8-bit weights according to the predetermined ratio when the training data set and the validation data set exists, further comprising:
    (a) using the validation data set to measure an accuracy of the quantized neural network model;
    (b) when the accuracy is within a preset range, using the quantized neural network model as an optimized neural network model, and outputting the optimized neural network model, and when the accuracy is not within the preset range, determining whether the training data set exists;

(c1) when the training data set exists, performing re-training and returning to the step (a) to measure the accuracy again;

(c2) when the training data set does not exist, adjusting the predetermined ratio and quantizing the weights again, and returning to the step (a) to measure the accuracy again.

8. The separate quantization method according to claim 7, wherein in the step (c1), the operation of performing re-training comprises:

in a forward stage, quantizing the weights of each of the plurality of layers according to the predetermined ratio; and in a backward stage, storing the quantized weights as floating-point weights.

9. The separate quantization method according to claim 7, wherein the quantization starts with the predetermined ratio in which 1% of the weights are allocated to the 8-bit weights and 99% of the weights are allocated to the 4-bit weights, and ratio of the 4-bit weights is gradually decreased to increase the accuracy.

10. The separate quantization method according to claim 7, wherein a linear proportional compression is performed on the 4-bit weights and the 8-bit weights according to original data of the neural network model.

11. The separate quantization method according to claim 7, wherein the weight quantization is performed on weights of a convolution layer and a fully-connected layer of the neural network model.

* * * * *